United States Patent [19]
Gross et al.

[11] Patent Number: 5,021,777
[45] Date of Patent: Jun. 4, 1991

[54] MODE-SELECTABLE COMMUNICATIONS SYSTEM

[75] Inventors: Ronald Gross, Portsmouth, N.H.; Walter L. Bennett, Andover, Mass.

[73] Assignee: Transition Technology, Inc., Amesbury, Mass.

[21] Appl. No.: 258,598

[22] Filed: Oct. 14, 1988

[51] Int. Cl.⁵ .............................................. H04Q 3/00
[52] U.S. Cl. ........................... 340/825.54; 340/310 R; 340/505
[58] Field of Search ...................... 340/825.52, 825.54, 340/825.07, 825.06, 504, 505, 310 R, 310 A, 825.5, 825.51; 370/92, 85.2

[56] References Cited

U.S. PATENT DOCUMENTS

4,093,946  6/1978  Fowler ................................. 340/505
4,139,737  2/1979  Shimada et al. ............. 340/310 A X
4,173,754  11/1979  Feiker ......................... 340/310 A X
4,206,449  6/1980  Galvin et al. ....................... 340/505
4,413,258  11/1983  Quick, Jr. et al. ............... 340/825.5
4,418,333  11/1983  Schwarzbach et al. ... 340/825.07 X
4,535,401  8/1985  Penn ................................. 340/505 X
4,825,196  4/1989  Morita ............................ 340/505 X Primary Examiner—Ulysses Weldon
Attorney, Agent, or Firm—Joseph S. Iandiorio

[57] ABSTRACT

A mode-selectable communications system which commands one or more remote modules from a controller unit. The controller unit issues a command signal having an address and major communications mode command. Each remote module includes a major mode identifier for receiving the command signal from the control unit through a communications link. The major mode identifier identifies an address pertaining to the module and identifies a major communications mode for that module as a command response mode or a time slot mode. The module implements a task indicated by the command mode and selects a time slot response based on the time slot mode. A time slot unique to that module is determined and the module communicates with the control unit through the communications link during that time slot.

16 Claims, 6 Drawing Sheets

MODE-SELECTABLE COMMUNICATIONS SYSTEM

FIELD OF INVENTION

This invention relates to a high-speed communications system having a controller and a number of remote modules, and more particularly to such a communication system which switches between a command response mode and a time slot mode to rapidly and efficiently command individual modules in the first mode and to rapidly and efficiently communicate with a large number of modules in the second mode.

BACKGROUND OF INVENTION

There are a number of applications in which a central control unit must communicate with a number of remote modules over a single communications link. One such application is in the field of computer I/O (input-/output) networks for industrial uses. An output module relays commands to machinery, such as on/off commands for a motor. An input module gathers information from a sensor, such as the operating speed or temperature of the motor.

Presently, communication between the controller unit and a large number of remote modules over the single communications link is relatively inefficient. Most systems have a relatively high communications overhead: a relatively large amount of the information transmitted between the controller and the modules relates to addressing and other communications protocol rather than to actual data. Present I/O systems are also inefficient in their use of hardware. Typically, one or more microprocessors are devoted to I/O processing while a separate microprocessor is required for communications.

There are a number of different types of communications protocol for transferring information between a control unit and a number of remote modules over a single communications link. Under one protocol, the modules are individually addressed and information is transmitted to or received from the identified module. Under another protocol, referred to as a time slot mode, modules are activated to receive or transmit information during sequential time slots. However, there is a need for a versatile communications system which can accommodate both commands to specific modules and routine polling of a large number of modules.

SUMMARY OF INVENTION

It is therefore an object of this invention to provide a mode-selectable communications system which can efficiently handle both command of specific modules and high-speed receipt of information from and transmission to other modules.

It is a further object of this invention to provide such a communications system which has a low communication overhead and a high data-to-baud rate ratio.

Yet another object of this invention is to provide a communications system in which a single processor can be used in each module, thereby obviating the need for a second processor devoted to communications.

It is a further object of this invention to provide such a communications system which can selectively interrupt the module processor to maximize the amount of I/O processing while minimizing the amount of processing required for communications.

A still further object of this invention is to provide such a communications system which is faster, less expensive, and more flexible.

This invention results from the realization that a truly effective communications system can be achieved by one or more remote modules which communicate with a controller through a communications link, each module having an address and major mode identifier which recognizes when that module has been hailed by the controller and identifies the major mode selected by the controller as a command response mode or a time slot mode, the module implementing a task indicated by the command mode, and the module selecting a time slot response based on the time slot mode, the response being executed only during a time slot unique to that module to enable efficient, high-speed time-sharing over the communications link.

This invention features a mode-selectable communications system for commanding at least one remote module from a control unit by a command signal having an address and major communications mode command. The system includes a remote module which communicates with the controller unit through a communications link. The module includes major mode identifier means for receiving the command signal from the controller unit, for identifying an address pertaining to the remote module, and for identifying a major communications mode for that module as a command response or a time slot mode. The module further includes command response means, responsive to the major mode identifier means, for implementing a task indicated by an identified command response mode. Further, time slot response means, responsive to the major mode identifier means, determines a time slot unique to that module and communicates, based on the identified time slot mode, with the controller unit through the communications link during that unique time slot. In one embodiment, the time slot response means includes timer means for defining a first preselected timing period, and time slot identifier means for selecting a time slot response based on an identified time slot mode and for initializing the timer means. The time slot response means further includes means, enabled by the timer means when the timing period expires, for executing the selected time slot response to communicate with the controller unit through the communications link during the unique time slot. The module includes processor means for executing duties of the module, and the major mode identifier means includes means for interrupting the processor means when the command signal is received. The time slot identifier means includes means for deinterrupting the processor means after the timer means is initialized, and the means for executing includes means for reinterpreting the processor means to execute the selected time slot response.

The time slot identifier means may also include means for formatting the time slot response to include a unique address for the module and to include in the time slot response the time slot mode commanded by the controller unit. The time slot identifier means may also include means for identifying one or more minor time slot modes such as an input mode, an output mode, and/or a readback mode. The timer means can define two different timing periods, and the means for executing can execute one time slot response to implement one of the minor modes during a first unique time slot, and executes a second time slot response to implement the other minor mode during a second unique time slot. The command response means includes means for reconfiguring the unique time slot, and formats an acknowledgement to the controller unit which includes the unique address for the module and the command response mode.

This invention further features a mode-selectable communications system including a control unit, at least two remote modules, and a communications link which interconnects the control unit and the modules. Each module includes major mode identifier means, command response means, and time slot response means as described herein.

DISCLOSURE OF PREFERRED EMBODIMENT

Other objects, features, and advantages will occur from the following description of a preferred embodiment and the accompanying drawings, in which.

This invention may be accomplished by a mode-selectable communications system which commands one or more remote modules from a controller unit. The control unit transmits, through a communications link, a command signal having an address and major communications mode command. Each module includes a major mode identifier for receiving the command signal from the controller unit. The major mode identifier identifies an address pertaining to the remote module, and identifies a major communications mode for that module as a command response mode or a time slot mode. The module further includes a command response unit which implements a task indicated by an identified command response mode, and a time slot response unit which determines a time slot unique to that module and communicates, based on the identified time slot mode, with the controller unit through the communications link during that unique time slot.

Figure 1A:
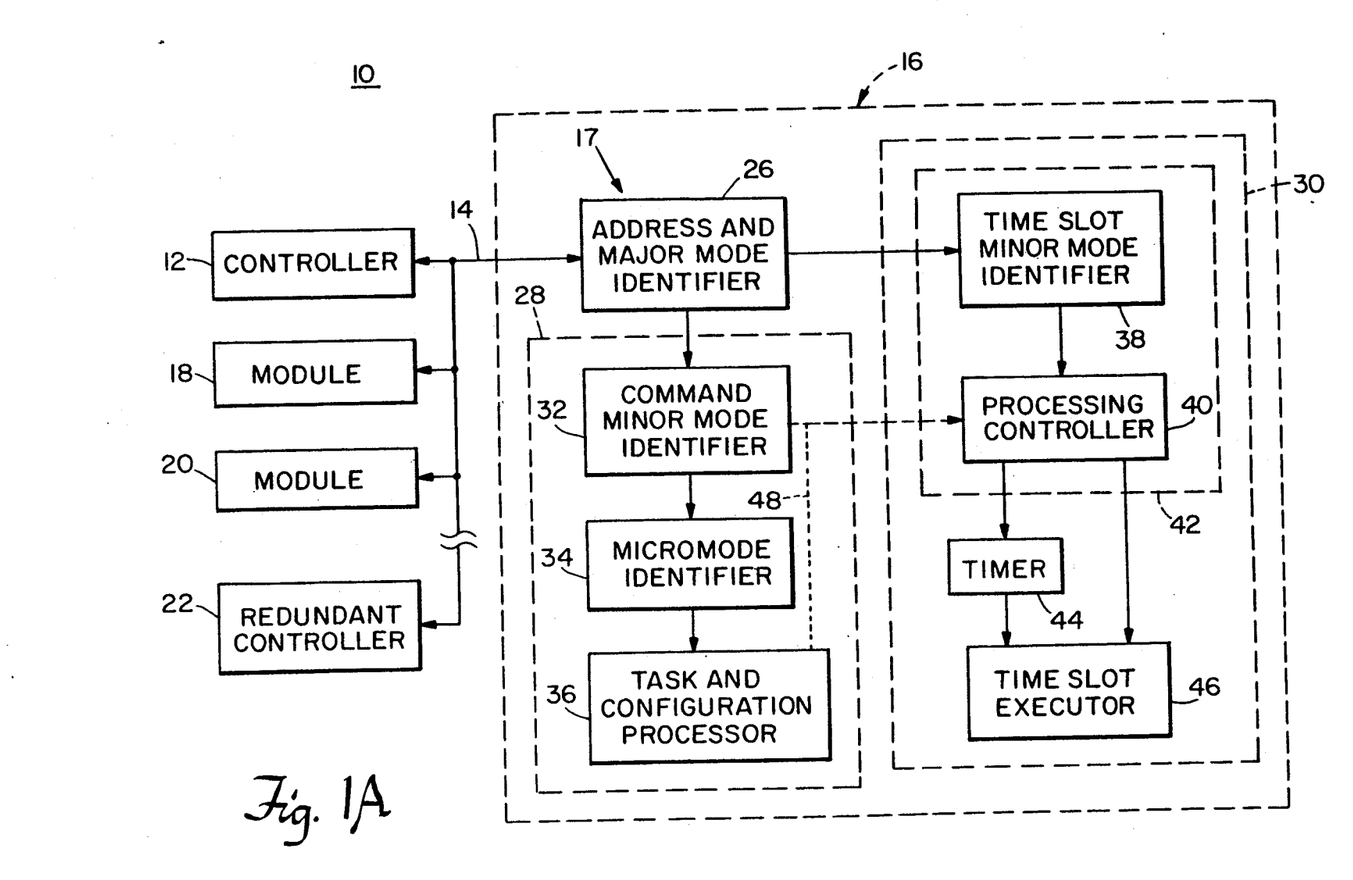
FIG. 1A is a schematic block diagram of a communications system according to this invention for a controller and a number of remote modules.

Communications systems 10 according to this invention, FIG. 1A, includes controller 12, communications link 14, and remote I/O modules 16, 18, 20 which communicate with controller 12 through communications link 14. In this construction, communications system 10 further includes redundant controller 22 which can replace controller 12 as described below.

Module 16 includes module communications system 17 according to this invention. Module communications system 17 includes address and major mode identifier 26, command response unit 28, and time slot response unit 30. Controller 12 transmits a command signal having an address and major communications mode command. This command signal is received by address and major mode identifier 26 of module 16, as well as by modules 18 and 20. Identifier 26 identifies an address pertaining to module 16 and identifies the major communication mode as a command response mode or a time slot mode. As described in more detail below, controller 12 utilizes a command response to command a specified module to perform a specified task. Therefore, an individual address identifies the selected module. For the time slot mode, a global address is sent which applies to all modules.

When a command response mode is identified, identifier 26 communicates with command response unit 28. Command minor mode identifier 32 then identifies the next level of command to identify the particular task. Command response unit 28 further includes micromode identifier 34. Once the particular task is identified by command minor mode identifier 32 or micro mode identifier 34, if used, task and configuration processor 36 is enabled to implement the task. In one embodiment, FIG. 1C, response unit 28 does not include a micromode identifier.

Upon identification of the major mode as a time slot mode, time slot response unit 30 is enabled by identifier 26. Time slot minor mode identifier 38 of time slot identifier unit 42 further identifies one of several minor modes and instructs processing controller 40 to develop a time slot response based on the identified time slot minor mode. Time slot identifier unit 42 then initiates timer 44 to begin counting a first preselected timing period. Time slot identifier unit 42 also instructs time slot executor 46 as to the type of time slot response to be executed upon expiration of the first timing period. Module 16 then transmits a message having a predetermined length to controller 12 during a unique time slot which commences upon expiration of the first timing period. If module 16 requires output data, it then receives a message having a second predetermined length from controller 12 during a second unique time slot at the expiration of a second timing period.

Figure 1B:
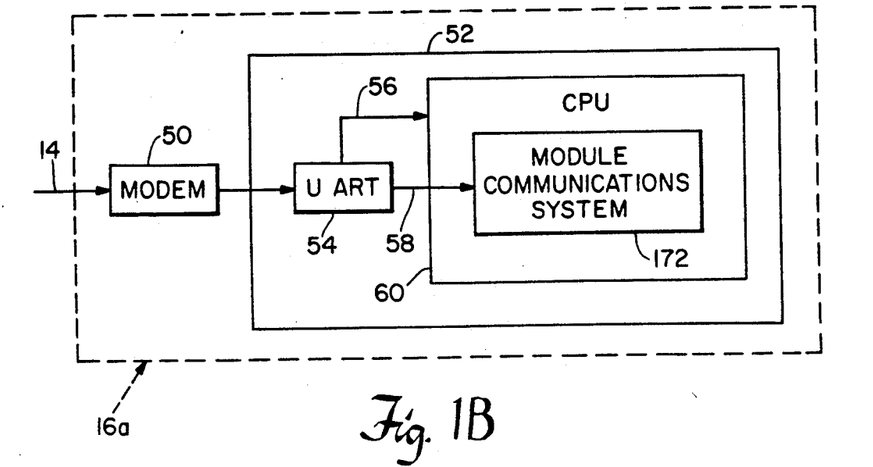
FIG. 1B is a schematic diagram showing one implementation of one of the modules shown in FIG. 1A.
Figure 1C:
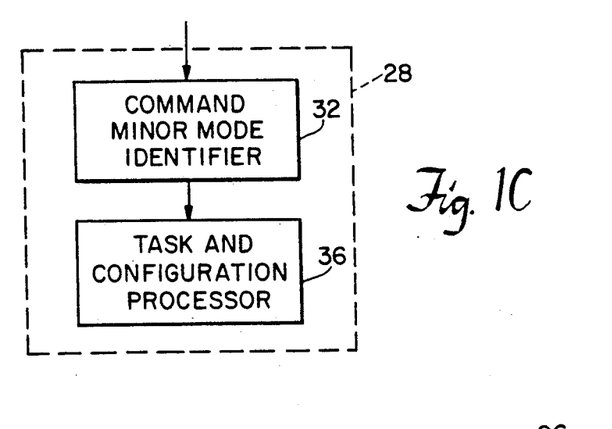
FIG. 1 is a schematic diagram showing one implementation of one of the units shown in FIG. 1A.

One implementation of module 16 is shown in FIG. 1B. Communication link 14 is connected to modem 50 which passes the demodulated signal to microcontroller 52. In this construction the microcontroller is model 80C31 from Intel. Microcontroller 52 includes UART 54, which is a universal asynchronous receiver transmitter. The communication system according to this invention enables UART 54 to operate at 375 Kbaud communications speed. When a command signal is detected, the normal processing of microcontroller 52 is interrupted through line 56 and the remainder of the command signal is passed through line 58 to module communication system 17a. Module communication system 17a is part of CPU 60, which carries out monitoring and control of various industrial devices. Module communication system 17a corresponds with system 17 shown in FIG. 1A; UART 54 is part of the address and major mode identifier.

Figure 2A:
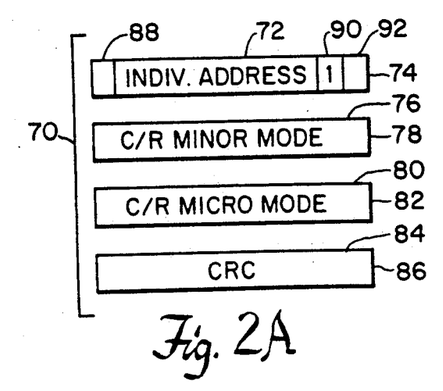
FIG. 2A is a schematic diagram of a command signal transmitted by the controller for a command response mode.
Figure 2B:
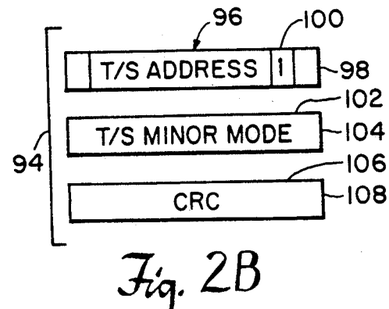
FIG. 2B is a schematic diagram of a command signal transmitted by the controller for a time slot mode.

The command signals for the command response mode and time slot mode are shown in FIGS. 2A, 2B, respectively. Command signal 70 includes individual module address 72 in first byte 74, command response minor mode signal 76 in second byte 78, and command response minor mode 80 in third byte 82. Command signal 70 also includes CRC 84 in byte 86, which is a cyclic redundancy check or other error detection scheme. In one implementation, two bytes are utilized for a sixteen checksum cyclic redundancy check.

There are eleven bits in byte 74: start bit 88; eight data bits 72, which in this case designate an individual module address; utility bit 90; and stop bit 92. When utility bit 90 is a digital one, UART 54, FIG. 1B, interrupts the operation of microcontroller 52 over line 56. No such interruption occurs when utility bit 90 is a digital zero. Utility bit 90 also serves as a synchronization bit which sets the time period timer for the time slot mode.

Command signal 94, FIG. 2B, designates a time slot mode command and includes global time slot address 96 in first byte 98. Utility bit 100 is set to digital "one". Command signal 94 further includes time slot minor mode data 102 in byte 104, and CRC 106 error check in byte 108.

The operation of communication system 10, FIG. 1A, is further explained in FIGS. 3-9. Upon detection of a utility bit, the main processing of module 16 is interrupted, step 110, FIG. 3. The data byte is retrieved through line 58, FIG. 1B, as represented by step 112. The major mode is identified, step 114, as a time slot mode or command response mode. The address itself provides this information, as described above: an individual module address, e.g. a number between 1 and 120, designates a particular module for a command response mode. A different number, e.g. number 127, is a global address which applies to all modules.

Figure 3:
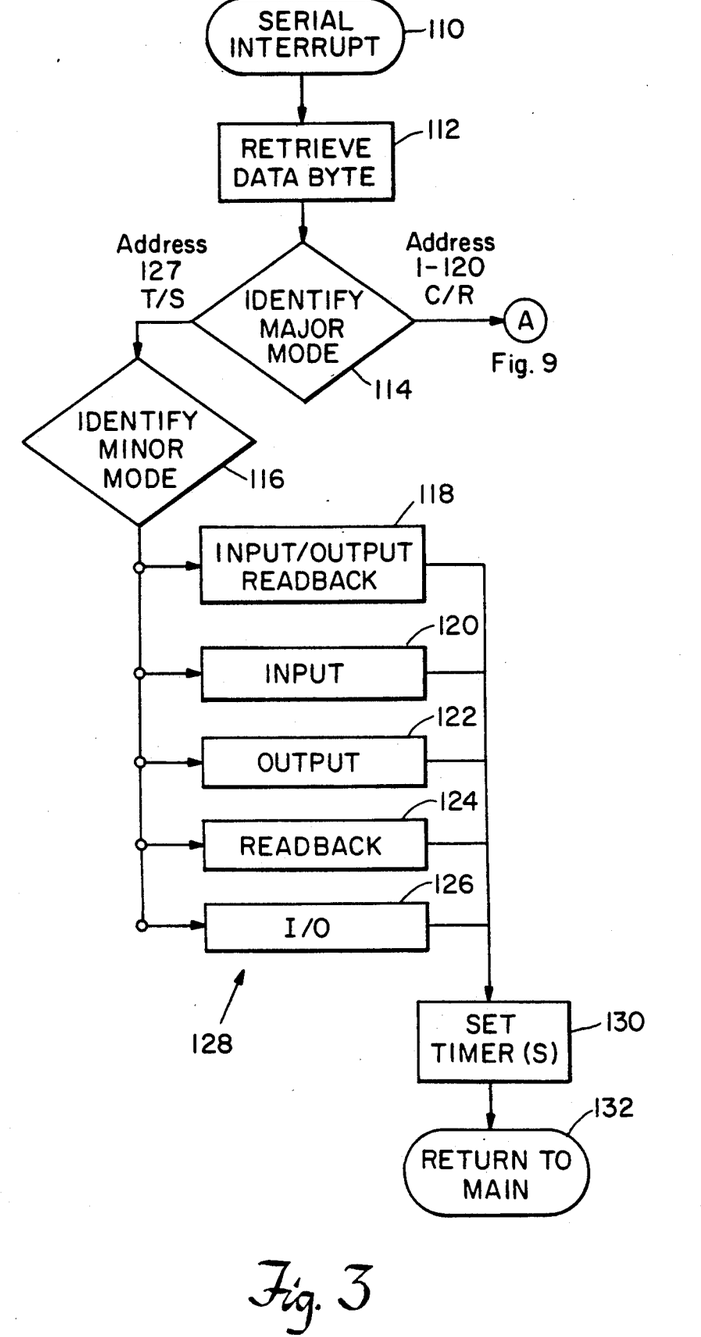
FIG. 3 is a flowchart showing identification of major modes and processing of a time slot mode by one of the modules.

When a time slot mode is identified, the minor time slot mode is then identified, step 116. Minor modes in this implementation are one of five minor modes: input/output/ readback, step 118, input 120, output 122, readback 124, and input/output 126. These minor modes and the time slot response executed in response to these modes are described below. After selecting a time slot response through steps 128, one or more timers are set, step 130, and the CPU logic returns to main processing, step 132.

Figure 4:
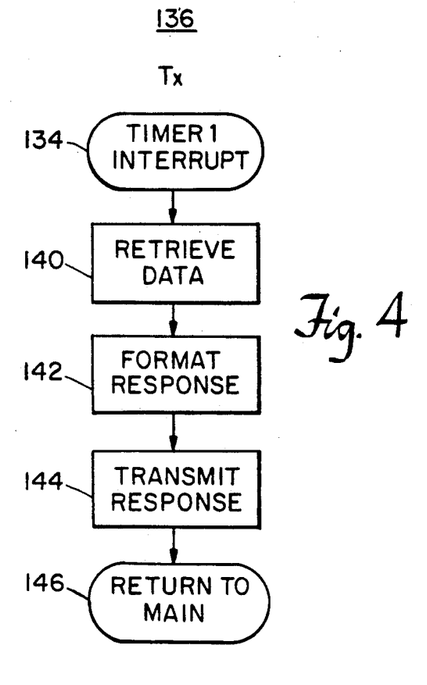
FIG. 4 is a flowchart of transmission by a module execute a time slot response.

Upon expiration of a first preselected timing period defined by timer 1 (not shown), main processing is interrupted, step 134, FIG. 4. Routine 136 is conducted when the module is used to transmit information, such as during an input mode or a readback mode. By comparison, routine 138, FIG. 6, receives information such as during an output mode, as described below.

The next step in routine 136, FIG. 4, is retrieval of data to be transmitted, step 140. The time slot response is formatted, step 142, including formatting of the module address and additional information indicating the major and/or minor time slot mode to "echo" the command signal from the controller. The response is transmitted, step 144, and the logic returns to main processing, step 146.

Figures 5, 9:
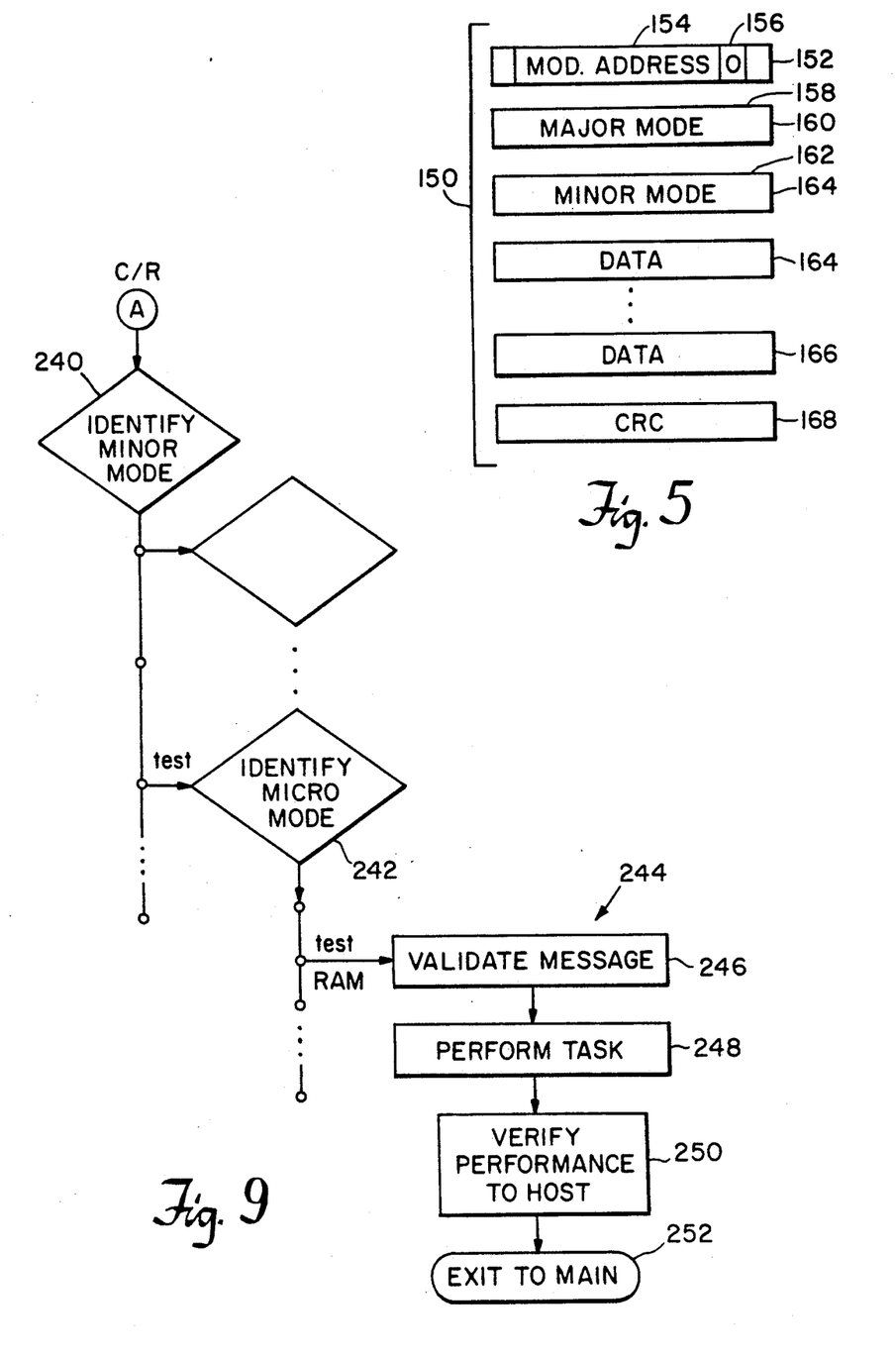
FIG. 5 is a schematic diagram of a response transmitted by one of the modules.
FIG. 9 is a partial flowchart of implementation of a command response mode by one of the modules of FIG. 1A.

Time slot response signal 150, transmitted by module 16, is shown in FIG. 5. First byte 152 includes module address 154. Utility bit 156 is set to digital zero. In this implementation, time slot response signal 150 further includes major mode information 158 in byte 160 and minor mode information 162 in byte 164. This "echoing" of the command signal enables redundant controller 22, FIG. 1A, to monitor communications link 114 and to instantly replace controller 12 upon occurrence of a preselected condition, such as the failure of controller 12. Further, modules 18, 20 can be microprocessors such as that found in an IBM PC or other computer, which can in turn service a controller for a different hierarchy of remote modules. Time slot response signal 150 further includes data bytes 164-166 which provide information sensed by the module during an input mode or verification of an output command during a readback mode. One or more bytes 168 provide error checking information.

Alternatively, an acknowledgment signal is sent during a command response mode to echo the module address and mode commands and to indicate the task performed. Such information would be transmitted in bytes 164-166.

Figure 6:
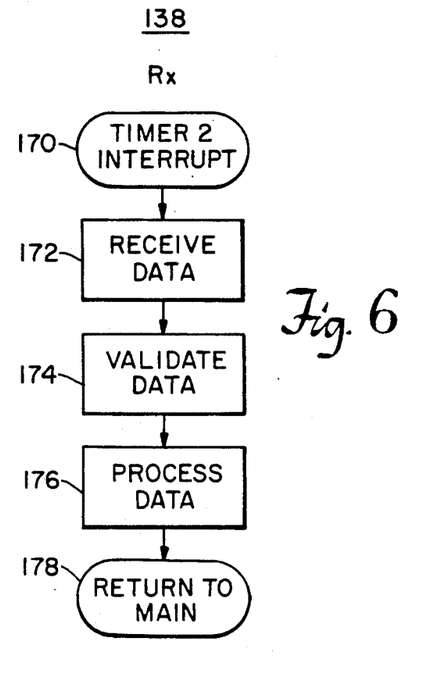
FIG. 6 is a flowchart showing reception by one of the modules as a time slot response.

When information is to be received, routine 138, FIG. 6, is begun once timer 2 (not shown) indicates expiration of a second timing period, step 170. Information transmitted from the controller is received, step 172, and validated, step 174, including cyclic redundancy checks and verification of correct address. The received data is then processed, step 176, and logic returns to main processing, step 178.

Figure 7:
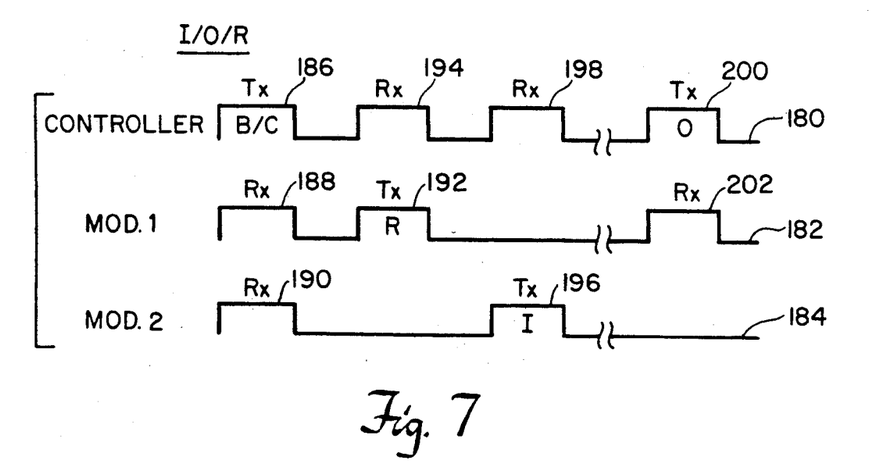
FIG. 7 is a timing diagram of respective transmission and reception for a controller and two modules.

The operation of the different time slot minor modes is illustrated in the timing diagram of FIG. 7 for an input/output/readback (I/O/R) mode. Pulse train 180 indicates activity of the controller, pulse train 182 indicates activity of module 1, and pulse train 184 indicates activity of module 2. A command signal having a time slot command is transmitted by the controller, pulse 186. The time slot command is received by modules 1 and 2, pulses 188, 190, which also initiate their respective timers: the utility bit in the first byte of the command signal serves as a synchronization bit to set the timers. Module 1 is an output module which transmits readback information and receives output data. Module 2 is an input module which transmits input information but does not receive information during a time slot response. Upon expiration of a first time period, module 1 transmits readback information R during a first time slot, pulse 192. This information is received by the controller, pulse 194. Upon expiration of a second communications time period, which is the first time period for module 2 as determined by a timer within module 2, input information is transmitted, pulse 196, and received by the controller, pulse 198. A timer within the controller instructs the controller to continue to receive until all transmission time slots have been passed. After a short time delay, as counted by timers in both the controller and module 1, output information is then transmitted, pulse 200, which is received by output module 1 during pulse 202.

Figure 8:
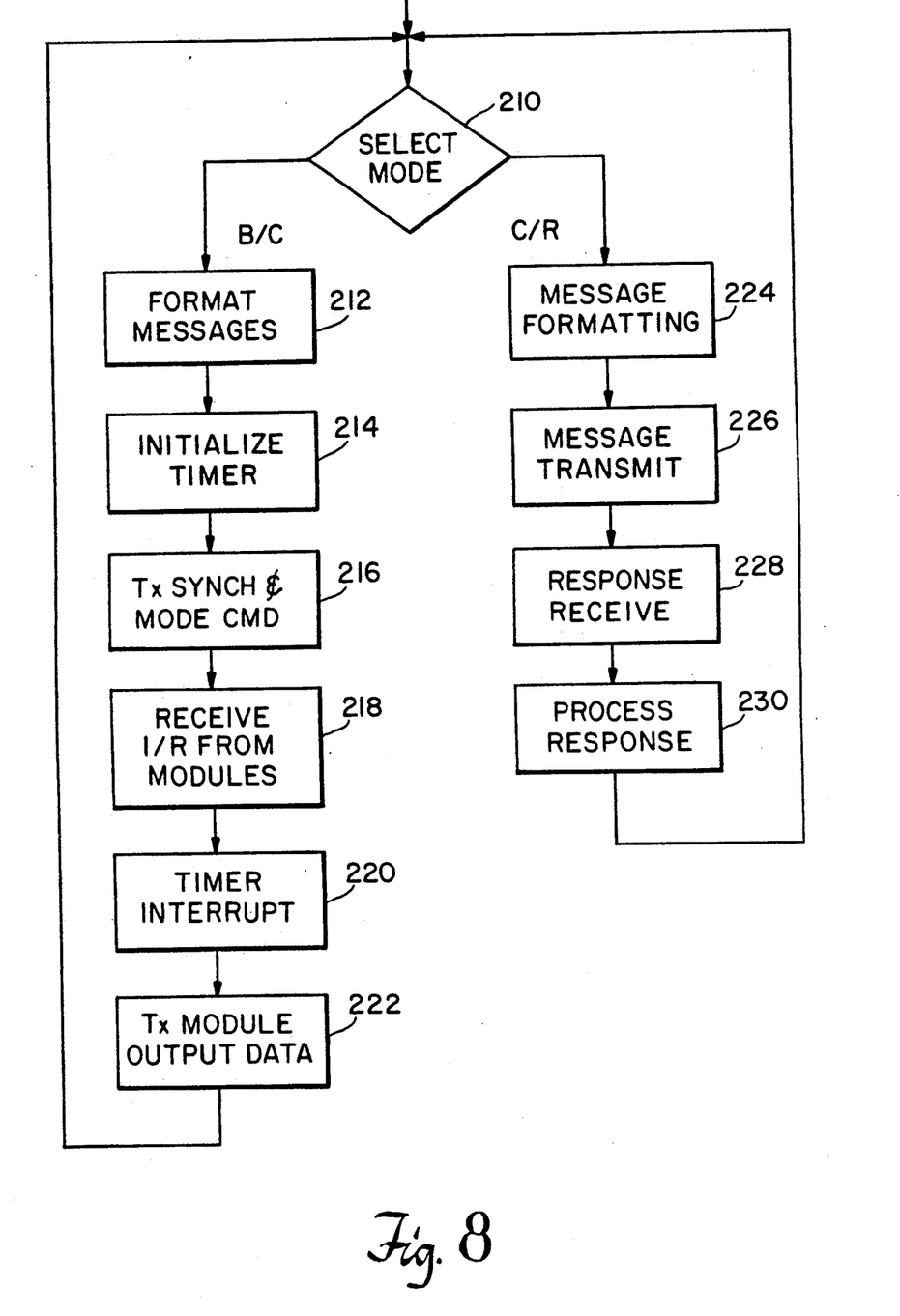
FIG. 8 is a flowchart of mode selection accomplished by the controller shown in FIG. 1.

The operation of the controller is shown in FIG. 8. The mode to be commanded is selected, step 210, as a time slot mode or command response mode. When a time slot mode is selected, messages corresponding to FIG. 2B are formatted, step 212, and a timer is initialized, step 214, to establish a reception window to receive information transmitted from the modules. The synchronization and mode command is transmitted, step 216, and input and/or readback information is received from the modules, step 218. A timer interrupt is received, step 220, upon expiration of the reception window, and output data is transmitted to the modules, step 222, after a short delay to avoid overlap among the modules.

When a command response is selected, the message is formatted, step 224, to provide a command signal corresponding to that shown in FIG. 2A. In one implementation, data is also transmitted with the command response mode signal. As an example, the operating characteristics of a particular module can be altered such as by resetting its unique time slot. This reconfiguration is indicated by dashed line 48, FIG. 1A, through which configuration processor 36 reconfigures processing controller 40.

After formatting, the message is transmitted, step 226, FIG. 8, and an acknowledgment response is received, step 228. The acknowledgment from the module is then processed, step 230, to confirm proper implementation of the task.

Implementation of the identified task is shown in FIG. 9, which is a continuation of the flow chart of FIG. 3. A minor communication mode is identified, step 240, such as a test mode to validate the operation of various components of the module or the sensors to which it is connected, a configuration to reconfigure operation of the module, or a data mode in which information is transmitted to or received from the module. Identification of the test minor mode is illustrated by step 242. In particular, testing of RAM (random access memory) is illustrated by steps 244. The command signal message is validated, step 246, and a particular task is performed, in this case validation of the RAM, step 248. Verification of task performance is then acknowledged to the host, step 250, after which the processor returns to main processing, step 252.

Typically, upon initial interruption of main processing by receipt of the command signal, the interruption continues until the command response mode is fully executed. In contrast, interruption of main processing is minimized during the time slot mode. Minimal interruption is accomplished by the timers, which allow main processing to resume until a particular time slot is reached. High-speed data communication is thereby achieved by the system, while module processing is maximized because the modules are freed to do other processing until the time slot is reached.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A mode-selectable communications system for commanding at least one remote module from a controller unit by a command signal having an address and major communications mode command, the system comprising:

a remote module, communicating with the controller unit through a communication link, including:

major mode identifier means for receiving the command signal from the controller unit, for identifying an address pertaining to the remote module, and for identifying a major communications mode for that module as a command response mode or a time slot mode;

command response means, responsive to said major mode identifier means, for implementing a task indicated by the identified command response mode; and time slot response means, responsive to said major mode identifier means, for determining at least one time slot unique to that module and for communicating, based on the identified time slot mode, with the controller unit through the communications link during that time slot, said time slot response means including timer means for defining a first preselected timing period;

time slot identifier means, responsive to said major mode identifier means, for selecting a time slot response based on the identified time slot mode and for initializing said timer means; and means, enabled by said timer means when the timing period expires, for executing the selected time slot response to communicate with the controller unit through the communications link during unique time slot.

2. The system of claim 1 in which the module includes processor means for executing duties of the module and said major mode identifier means includes means for interrupting said processor means when the command signal is received.

3. The system of claim 2 in which said time slot identifier means includes means for deinterrupting said processor means after said timer means is initialized, and said means for executing includes means for reinterrupting said processor means to execute the selected time slot response.

4. The system of claim 1 in which said time slot identifier means includes means for formatting the time slot response to include a unique address for the module and to include the time slot mode commanded by the control unit.

5. The system of claim 1 in which said time slot identifier means includes means for identifying a minor time slot mode.

6. The system of claim 5 in which the minor modes are an input mode, an output mode, a readback mode, or a combination thereof.

7. The system of claim 6 in which said means for identifying identifies at least two minor modes, said timer means further defines a second preselected timing period, and said means for executing executes a first time slot response for one of said minor modes during a first unique time slot and executes a second time slot response to implement the other minor mode during a second time slot unique to that module.

8. The system of claim 1 in which said command response means includes means for reconfiguring said time slot response means to establish a different unique time slot for that module.

9. The system of claim 1 in which said command response means includes means for transmitting an acknowledgment to the control unit, the acknowledgment including a unique address for the module and further including the command response commanded by the control unit.

10. A mode-selectable communications system comprising:

a controller unit for generating a command signal having an address and major communications mode command;

at least two remote modules;

a communications link interconnecting said controller unit and said modules;

each module including:

major mode identifier means for receiving the command signal from the controller unit, for identifying an address pertaining to that remote module, and for identifying a major communications mode for that module as a command response mode or a time slot mode;

command response means, responsive to said major mode identifier means, for implementing a task indicated by the identified command response mode; and time slot response means, responsive to said major mode identifier means, for determining a time slot unique to that module and for communicating, based on the identified time slot mode, with said control unit through said communications link during that time slot, said time slot response means including timer means for defining a first preselected timing period unique to that module;

time slot identifier means, responsive to said major mode identifier means, for selecting a timer slot response based on the identified time slot mode and for initializing said timer means; and means, enabled by said timer means when the timing period expires, for executing the selected time slot response to communicate with the controller unit through said communications link during the unique time slot.

11. The system of claim 10 in which the module includes processor means for executing duties of the module, and said major mode identifier means includes means for interrupting said processor means when the command signal is received.

12. The system of claim 11 in which said time slot identifier means includes means for deinterrupting said processor means after said timer means is initialized, and said means for executing includes means for reinterrupting said processor means to execute the selected time slot response.

13. The system of claim 12 in which said time slot identifier means includes means for formatting the time slot response to include a unique address for the module and to include the time slot mode commanded by the control unit.

14. The system of claim 12 in which said time slot identifier means includes means for identifying a minor time slot mode and the minor modes are an input mode, an output mode, a readback mode, or a combination thereof.

15. The system of claim 14 in which said means for identifying identifies at least two minor modes, said timer means further defines a second preselected timing period, and said means for executing executes a first time slot response for one of said minor modes during a first unique time slot and executes a second time slot response to implement the other minor mode during a second time slot unique to that module.

16. The system of claim 10 further including a redundant controller unit which monitors said communications link and replaces said control unit upon the occurrence of a preselected condition.

* * * * *